(12) United States Patent
Green et al.

(10) Patent No.: US 10,929,770 B2
(45) Date of Patent: Feb. 23, 2021

(54) SYSTEMS AND METHODS FOR RECOMMENDING PAGES

(71) Applicant: Facebook, Inc., Menlo Park, CA (US)

(72) Inventors: Bradley Ray Green, Snohomish, WA (US); James Wah Hou Wong, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 457 days.

(21) Appl. No.: 14/956,098

(22) Filed: Dec. 1, 2015

(65) Prior Publication Data
US 2017/0155726 A1    Jun. 1, 2017

(51) Int. Cl.
*G06F 16/954* (2019.01)
*G06Q 50/00* (2012.01)
*G06N 20/00* (2019.01)
*G06N 5/04* (2006.01)
*G06Q 30/02* (2012.01)

(52) U.S. Cl.
CPC ......... *G06N 20/00* (2019.01); *G06F 16/954* (2019.01); *G06N 5/04* (2013.01); *G06Q 30/0282* (2013.01); *G06Q 50/01* (2013.01)

(58) Field of Classification Search
CPC .. H04L 67/22; G06F 17/30873; G06N 99/005
See application file for complete search history.

(56) References Cited

U.S. PATENT DOCUMENTS

| | | | |
|---|---|---|---|
| 6,493,702 B1 * | 12/2002 | Adar | G06F 17/30884 707/706 |
| 9,799,035 B2 * | 10/2017 | Cama | G06Q 30/02 |
| 2003/0023715 A1 * | 1/2003 | Reiner | G06F 11/32 709/224 |
| 2011/0252342 A1 * | 10/2011 | Broman | G06F 17/30899 715/760 |
| 2012/0239506 A1 * | 9/2012 | Saunders | G06Q 30/02 705/14.67 |
| 2012/0271805 A1 * | 10/2012 | Holenstein | G06F 16/955 707/706 |
| 2014/0019240 A1 * | 1/2014 | Zhou | G06Q 30/0269 705/14.53 |
| 2014/0189530 A1 * | 7/2014 | Anand | H04L 65/403 715/753 |
| 2014/0379893 A1 * | 12/2014 | Kannan | H04L 67/22 709/224 |
| 2015/0242517 A1 * | 8/2015 | Campbell | G06F 16/9535 707/728 |
| 2015/0248484 A1 * | 9/2015 | Yu | H04L 61/15 707/711 |
| 2016/0196579 A1 * | 7/2016 | Koura | G06Q 30/0255 705/14.53 |

* cited by examiner

*Primary Examiner* — Davoud A Zand
(74) *Attorney, Agent, or Firm* — Sneppard Mullin Richter & Hampton LLP

(57) ABSTRACT

Systems, methods, and non-transitory computer-readable media can determine at least one web site that is of interest to a user of the social networking system. One or more pages can be determined based at least in part on the web site, the one or more pages being accessible through the social networking system. At least one page recommendation that references at least one of the one or more pages can be provided to the user.

20 Claims, 7 Drawing Sheets

SYSTEMS AND METHODS FOR RECOMMENDING PAGES

FIELD OF THE INVENTION

The present technology relates to the field of content provision. More particularly, the present technology relates to techniques for recommending pages.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, a user may navigate to or be presented with various content items in a social network. The content items can come from pages associated with members of the social network. In some instances, the content items may be of high interest to the user. If the user expresses interest in a particular content item, the social network may attempt, based on the content item, to provide to the user additional content items that would also be of interest to the user. Providing such additional content items can enhance the user experience and may help realize the full potential of the social network. Unfortunately, attempts to provide such additional content items and to maintain a high level of interest from the user often fail. The growing size of social networks can also pose problems with respect to the goal of providing content items of high interest to the user. As available content grows in amount, in theory, the likelihood of finding more content items of high interest to the user should increase. However, in practice, the ability to identify content items of high interest to the user can be complicated by the sheer volume of content.

SUMMARY

Various embodiments of the present disclosure can include systems, methods, and non-transitory computer readable media configured to determine at least one web site that is of interest to a user of the social networking system. One or more pages can be determined based at least in part on the web site, the one or more pages being accessible through the social networking system. At least one page recommendation that references at least one of the one or more pages can be provided to the user.

In an embodiment, the systems, methods, and non-transitory computer readable media are configured to determine a web site that the user has visited a threshold number of times over a period of time.

In an embodiment, the systems, methods, and non-transitory computer readable media are configured to generate respective scores for one or more web sites visited by the user, wherein a score for a web site is based at least in part on a respective decayed count of a number of visits to the web site over a period of time and determine the at least one web site based at least in part on the respective scores.

In an embodiment, the systems, methods, and non-transitory computer readable media are configured to generate a trained machine learning model for predicting whether a web site is of interest to the user.

In an embodiment, the machine learning model is trained using a set of inputs that each include features that at least identify a user, a web site visited by the user, a total number of visits to the web site by the user over a period of time, and decayed counts of the web site visits over the period of time.

In an embodiment, the systems, methods, and non-transitory computer readable media are configured to identify at least one page in the social networking system that is associated with a Uniform Resource Locator (URL) for the web site.

In an embodiment, the systems, methods, and non-transitory computer readable media are configured to determine the one or more pages from pages that were fanned by other users that also visited the web site.

In an embodiment, the systems, methods, and non-transitory computer readable media are configured to group users into one or more groups based at least in part on the respective web sites visited by the users, determine respective pages that were fanned by users in each group, and map the one or more groups to one or more of the fanned pages based at least in part on a collaborative filtering process.

In an embodiment, the systems, methods, and non-transitory computer readable media are configured to determine the one or more pages from pages that were fanned by other users that visited various web sites included in a cluster, wherein the cluster also includes the web site visited by the user.

In an embodiment, the systems, methods, and non-transitory computer readable media are configured to generate one or more clusters based at least in part on a set of sub-URLs that each correspond to web sites visited by users of the social networking system, determine respective pages that were fanned by users that visited one or more sub-URLs that are included in each of the one or more clusters, and map the one or more clusters to one or more of the fanned pages based at least in part on a collaborative filtering process.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
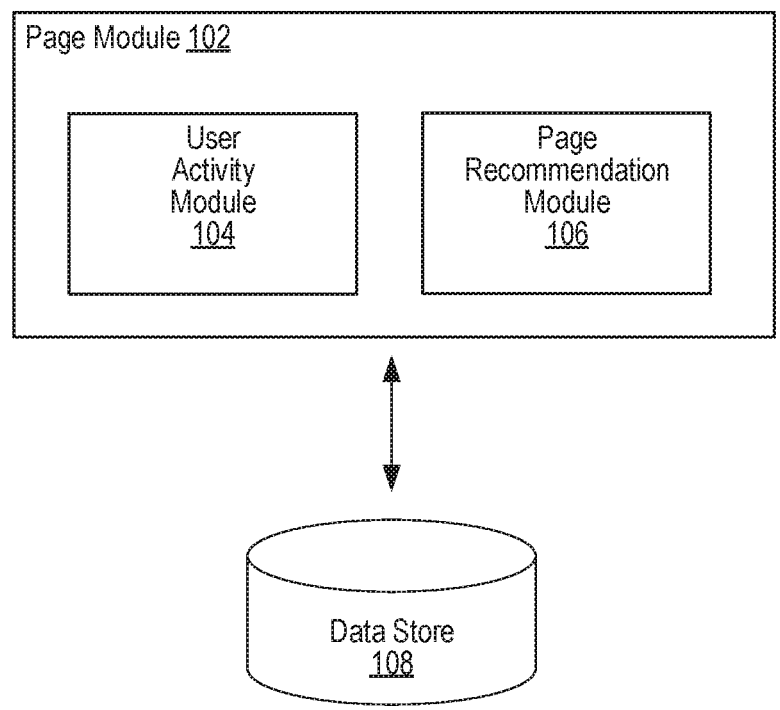
FIG. 1 illustrates an example system including an example page module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Recommending Pages

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, a user may navigate to or be presented with various content items in a social network. The content items can come from pages associated with members of the social network. In some instances, the content items may be of high interest to the user. If the user expresses interest in a particular content item, the social network may attempt, based on the content item, to provide to the user additional content items that would also be of interest to the user. Providing such additional content items can enhance the user experience and may help realize the full potential of the social network. Unfortunately, attempts to provide such additional content items and to maintain a high level of interest from the user often fail. The growing size of social networks can also pose problems with respect to the goal of providing content items of high interest to the user. As available content grows in amount, in theory, the likelihood of finding more content items of high interest to the user should increase. However, in practice, the ability to identify content items of high interest to the user can be complicated by the sheer volume of content. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, sites visited by users outside of a social networking system can be analyzed to provide recommendations for pages that are accessible through the social networking system. A site, for example, may be any web site, or web page, that is accessible through a network (e.g., the Internet) using a Uniform Resource Locator (URL) (e.g., http://www.example.com) and/or a sub-URL (e.g., http://www.example.com/abc or http://abc.example.com). In some embodiments, a user can be recommended pages that correspond to sites visited by the user. For example, a user that visits a URL http://www.example.com can be recommended a page accessible through the social networking system that corresponds to that URL www.example.com. In some embodiments, a user that visits certain sites can be recommended pages that are followed by other users that also visit those sites. In some embodiments, sites visited by users can be clustered to generate one or more clusters. For example, one cluster can correspond to articles about healthy eating. In such embodiments, users can be mapped to one or more clusters and be recommended pages that are followed by other users that also visit sub-URLs in the one or more clusters. In various embodiments, pages to be recommended may each correspond to an entity (e.g., a business, topic, location, user, etc.). Users of the social networking system can navigate to the page to learn more about the entity as well as access and/or post content through the page. Such content may include text and/or media content items, such as images, videos, and audio. Users of the social networking system have the option to be associated with the page, for example, by "liking" the page (e.g., selecting a "like" option through the social networking system) or by becoming a "fan" the page (e.g., selecting a "fanning" option through the social networking system). In some instances, the social networking system can include content items that are posted to the page in the respective news feeds of users that are associated with the page. Although the techniques described herein can be used to suggest pages to users, such techniques may be used for other purposes including, for example, query suggestions, profile suggestions, and/or for targeting advertisements to users.

FIG. 1 illustrates an example system 100 including an example page module 102, according to an embodiment of the present disclosure. As shown in the example of FIG. 1, the page module 102 can include a user activity module 104 and a page recommendation module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the page module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the page module 102 can be implemented, in part or in whole, as software running on one or more computing devices or systems, such as on a user or client computing device. In one example, the page module 102 or at least a portion thereof can be implemented as or within an application (e.g., app), a program, or an applet, etc., running on a user computing device or a client computing system, such as the user device 610 of FIG. 6. In another example, the page module 102 or at least a portion thereof can be implemented using one or more computing devices or systems that include one or more servers, such as network servers or cloud servers. In some instances, the page module 102 can, in part or in whole, be implemented within or configured to operate in conjunction with a social networking system (or service), such as the social networking system 630 of FIG. 6.

The page module 102 can be configured to communicate and/or operate with the at least one data store 108, as shown in the example system 100. The at least one data store 108 can be configured to store and maintain various types of data including audience data that identifies users of the social networking system that have "liked" or "fanned" pages that are available for access through the social networking system. The audience data can also describe respective sites that users have visited over some period of time (e.g., 30 day period, 60 day period, etc.). Depending on the implementation, such user data may only include data for users that have opted-in to the features described herein. Alternatively, in some implementations, the user data does not include data for users that have opted-out of the features described herein. In some implementations, the at least one data store 108 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data.

In various embodiments, the user activity module 104 can be configured to determine sites visited by users of the social networking system over some period of time. The user activity module 104 can also be configured to process the respective URLs and/or sub-URLs that correspond to the visited sites. More details regarding the user activity module 104 will be provided below with reference to FIG. 2. The page recommendation module 106 can be configured to utilize the sites visited by users to provide content (e.g., page) recommendations. More details regarding the page recommendation module 106 will be provided below with reference to FIG. 3.

Figure 2:
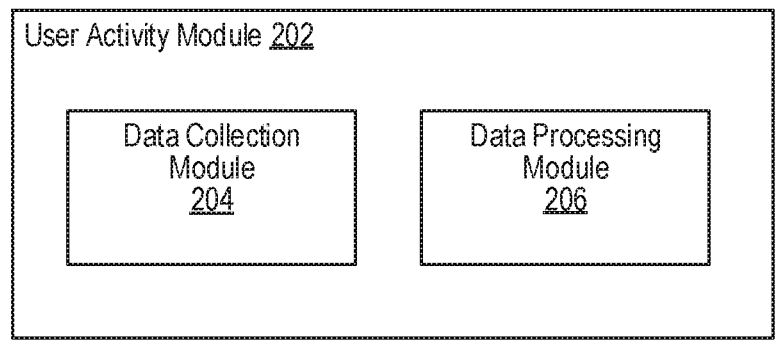
FIG. 2 illustrates an example of a user activity module configured to determine sites visited by users, according to an embodiment of the present disclosure.

FIG. 2 illustrates an example of a user activity module 202 configured to determine sites visited by users, according to an embodiment of the present disclosure. In some embodiments, the user activity module 104 of FIG. 1 can be implemented as the user activity module 202. As shown in FIG. 2, the user activity module 202 can include a data collection module 204 and a data processing module 206.

The data collection module 204 can be configured to determine sites visited by users. The data collection module 204 can be implemented in a social networking system (e.g., the social networking system 630 of FIG. 6). In some embodiments, sites can include social networking objects (e.g., a plug-in or widget) that correspond to features provided by the social networking system. For example, a site can include an object corresponding to a "like" button which, when selected, can be used to "like" a page that is accessible through the social networking system and that corresponds to the site. In another example, a site can include an object corresponding to a "share" button which, when selected, can be used to share a link to the site through the social networking system. Such objects can be embedded in sites using JavaScript code, for example. The objects can be rendered when a user visits the site, for example, by accessing a URL corresponding to the site using software application (e.g., web browser) running on a computing device. The data collection module 204 can determine that a user has visited a site when such objects are rendered. In some embodiments, when such objects are rendered, the data collection module 204 can also determine the identity of the user visiting the site provided that the user is logged into an account on the social networking system at the time of visiting the site. Based on the user identity, the data collection module 204 can also determine other information about the user including, for example, the pages in the social networking system that have been liked, or fanned, by the user. The data collection module 204 can store information describing user site visits including, for example, the user's identity, a URL that was used to access the site as captured by the data collection module 204, the types of objects that were rendered in the site, and a time stamp corresponding to the user's site visit, to name some examples. In various embodiments, the data collection module 204 can also determine any user interactions with the rendered objects (e.g., user clicking on a "like" button that was rendered in a site or user commenting in a comment box that was rendered in a site). The captured user interaction data can provide additional signals that may be utilized for making and/or refining page recommendations to users, either separately or in addition to the data describing the sites the user has visited. Naturally, users have the option to opt-out from any of the features described herein. That is, a user can disable any collection and processing of information that identifies, describes, or references any sites visited by the user. Moreover, once disabled, no page recommendations that result from analyzing such user site activity are provided to the user. In some implementations, the features described herein are inactive for a user until the user consents, or opts-in.

The data processing module 206 can be configured to normalize, or sanitize, site information (e.g., URLs, sub-URLs, etc.) that is captured by the data collection module 204. Site information can include URLs captured by the data collection module 204 that each correspond to a site visited by a user. A captured URL can include extraneous information in addition to the URL and/or sub-URL that corresponds to the site visited. For example, a captured URL can include cookie information, various parameters, query string parameters, dates (e.g., "/2015/08/15/"), among other extraneous information. In various embodiments, the data processing module 206 can discard, or sanitize, any extraneous information included in the captured URL. Once the extraneous information has been discarded, the data processing module 206 can extract the URL and/or sub-URL that corresponds to the site visited. For example, the data processing module 206 can discard extraneous information from a captured URL "www.example.com/abc/2015/08/15/xyz" and extract the site domain URL "example.com" and sub-URLs "example.com/abc" and "example.com/abc/xyz".

Once the site information has been normalized, the data processing module 206 can determine which sites (e.g., URLs and/or sub-URLs) best capture a user's interests. In some embodiments, the data processing module 206 can determine which sites best capture a user's interests by determining a list of the top n sites (e.g., site URLs and/or sub-URLs) visited by a user over a period of time (e.g., 30-day time period, 60-day time period, etc.). In such embodiments, each visit by the user to a URL and/or sub-URL over the period of time can be counted and these URLs and/or sub-URLs can be ranked by the number of visits. In some embodiments, rather than relying solely on the respective number of site visits, the data processing module 206 can generate respective scores for each site by computing a decayed count of the number of visits to the site over the period of time, so that more weight is given to a site's score if the user visited the site more recently than other sites. In some embodiments, the data processing module 206 can determine which sites best capture a user's interests by building a machine learning model that is trained to predict a likelihood that measures how relevant a domain, URL, and/or sub-URL is to a user. The machine learning model can be built, for example, using a set of inputs that each include features identifying a user, a site visited by the user (e.g., site URL, sub-URL, etc.), a total number of visits to the site over the period of time, and decayed counts of the site visits. The list of top sites visited by a user, site scores, and/or the trained machine learning model can be used to recommend pages to the user as described in reference to FIG. 3.

Figure 3:
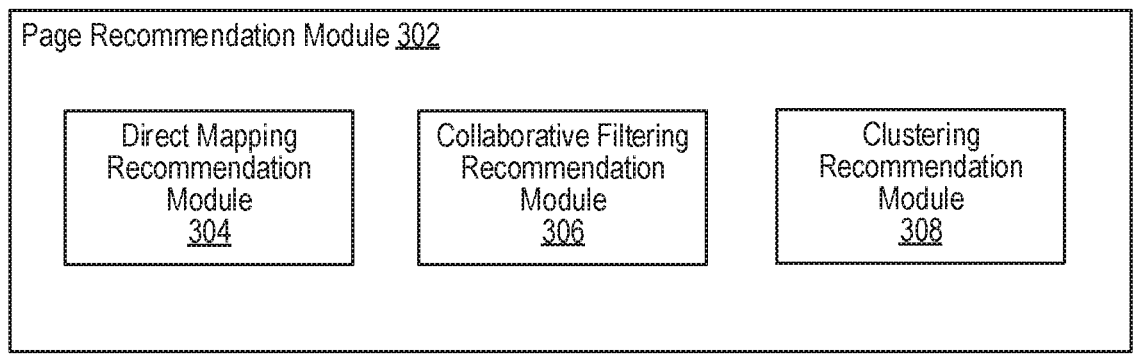
FIG. 3 illustrates an example of a page recommendation module configured to provide page recommendations, according to an embodiment of the present disclosure.

FIG. 3 illustrates an example of a page recommendation module 302 configured to provide page recommendations, according to an embodiment of the present disclosure. In some embodiments, the page recommendation module 106 of FIG. 1 can be implemented as the page recommendation module 302. As shown in FIG. 3, the page recommendation module 302 can include a direct mapping recommendation module 304, a collaborative filtering recommendation module 306, and a clustering recommendation module 308.

The direct mapping recommendation module 304 can be configured to identify pages in the social networking system that can be recommended to users. In some embodiments, the direct mapping recommendation module 304 can determine sites (e.g., URLs and/or sub-URLs) that are referenced in pages which are accessible through the social networking system. For example, a sports team may have a page in the social networking system through which the sports team posts various content. The same sports team may also have a web site that is accessible through a network (e.g., the Internet) outside of the social networking system. In this example, the sports team's page in the social networking system may include an external site URL that references the web site for the sports team. In such instances, the direct mapping recommendation module 304 can associate the external site URL with the sports team's page. In various embodiments, a user that has visited the external site URL can be provided the sports team's page as a recommended page.

The collaborative filtering recommendation module 306 can also be configured to identify pages in the social networking system that can be recommended to users. In various embodiments, the collaborative filtering recommendation module 306 can generate a site-to-page mapping by grouping all users who have visited a particular site (e.g., URL and/or sub-URL) and performing a generally known collaborative filtering process. Once the collaborative filtering process is complete, the collaborative filtering recommendation module 306 is able to utilize the site-to-page mapping to identify pages in the social networking system that were liked, or fanned, by users that visited a particular site. For example, the collaborative filtering recommendation module 306 can determine that users that visit the site "www.example.com" tend to fan pages A and B while users that visit the site "www.example.com/opinion" tend to fan pages B and C. In various embodiments, a user that has visited a site can be recommended pages in the social networking system that were fanned by other users who also visited that site.

The clustering recommendation module 308 can also be configured to identify pages in the social networking system that can be recommended to users. In various embodiments, the clustering recommendation module 308 can cluster URLs and/or sub-URLs corresponding to various sites (e.g., domains) visited by users and can map the respective clusters to pages in the social networking system using any generally known collaborative filtering process. For example, the clustering recommendation module 308 can compute pairwise similarity scores between sub-URLs visited by users over a period of time. A similarity score can be determined using any generally known technique for measuring the similarity between two strings. The clustering recommendation module 308 can also determine the inverse of such similarity scores to determine a respective distance between two sub-URLs. In other words, the larger similarity score for two sub-URLs, the shorter the distance, since the two sub-URLs are determined to be more related to one another. The clustering recommendation module 308 can use the respective distances between sub-URLs to generate clusters. In some embodiments, the clustering is performed using single-link agglomerative clustering. Each cluster of sub-URLs may represent a particular topic. For example, one cluster of sub-URLs may correspond to articles about eating healthy while another cluster of sub-URLs may correspond to articles about space exploration. The clustering recommendation module 308 can associate users of the social networking system with one or more of the generated clusters. In some embodiments, an association between a user and a cluster can be weighted. For example, the clustering recommendation module 308 can form an association, or link, between a user and a cluster when the user has visited a first sub-URL that is included in the cluster. In this example, the clustering recommendation module 308 can strengthen the association between the user and the cluster if the user has also visited a second sub-URL included in the cluster. The association may be strengthened, for example, by increasing the corresponding weight of the association between the user and the cluster. The clustering recommendation module 308 can determine a cluster-to-page mapping by grouping all users who have visited sub-URLs included in the clusters and performing a collaborative filtering process. Once the collaborative filtering process is complete, the clustering recommendation module 308 is able to utilize the cluster-to-page mapping to identify pages in the social networking system that were liked, or fanned, by users that visited sites included in a certain cluster. For example, the clustering recommendation module 308 can determine that users that visit the site "www.example.com/health" included in a first cluster tend to fan pages W and X while users that visit the site "www.example.com/opinion" included in a second cluster tend to fan pages Y and Z. In various embodiments, a user that has visited a first site included in a cluster can be recommended pages in the social networking system that were fanned by other users who also visited a second site included in the cluster.

Figure 4:
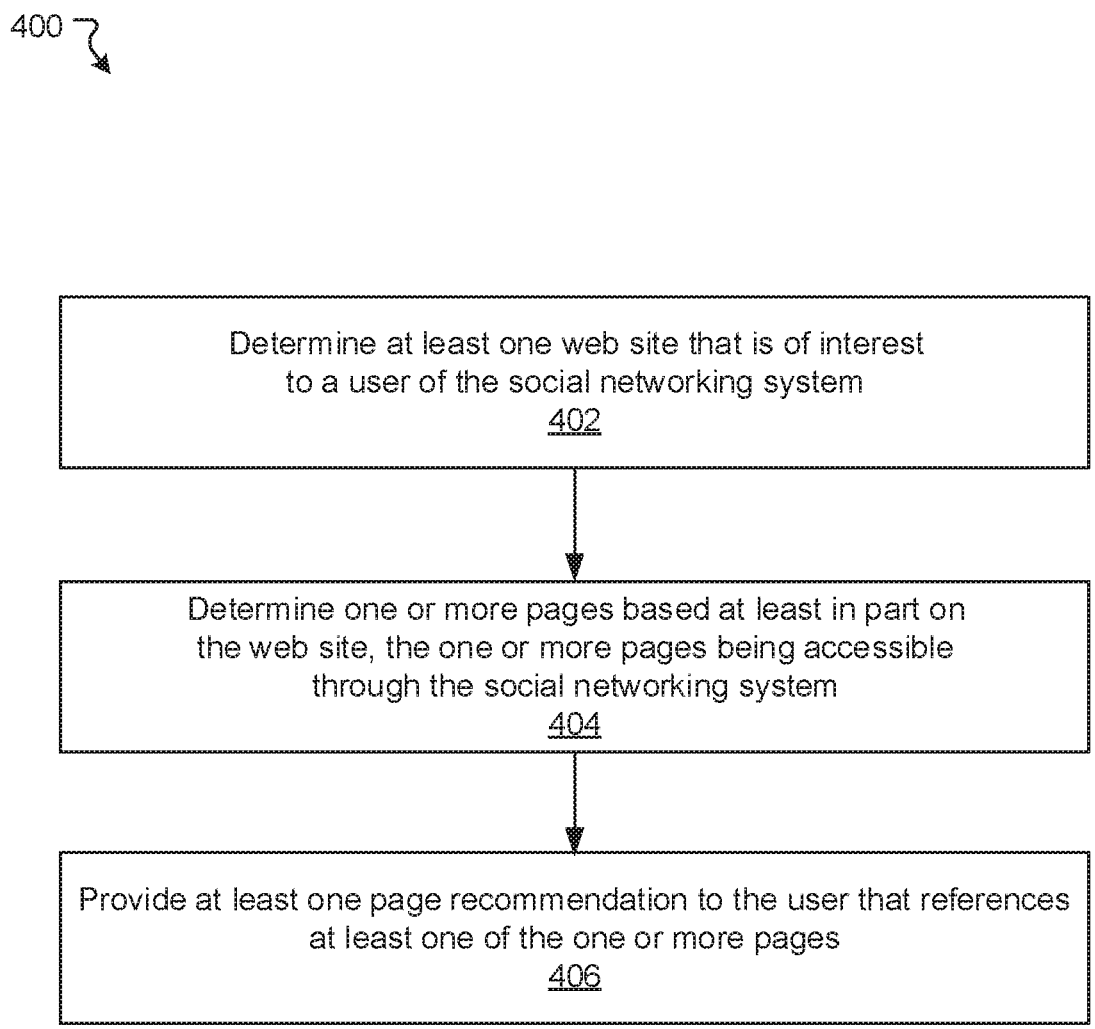
FIG. 4 illustrates an example process for determining page recommendations, according to an embodiment of the present disclosure.

FIG. 4 illustrates an example process for determining page recommendations, according to an embodiment of the present disclosure. It should be appreciated that there can be additional, fewer, or alternative steps performed in similar or alternative orders, or in parallel, within the scope of the various embodiments discussed herein unless otherwise stated. At block 402, at least one web site is determined to be of interest to a user of the social networking system. At block 404, one or more pages are determined based at least in part on the web site, the one or more pages being accessible through the social networking system. At block 406, at least one page recommendation that references at least one of the one or more pages can be provided to the user.

Figure 5:
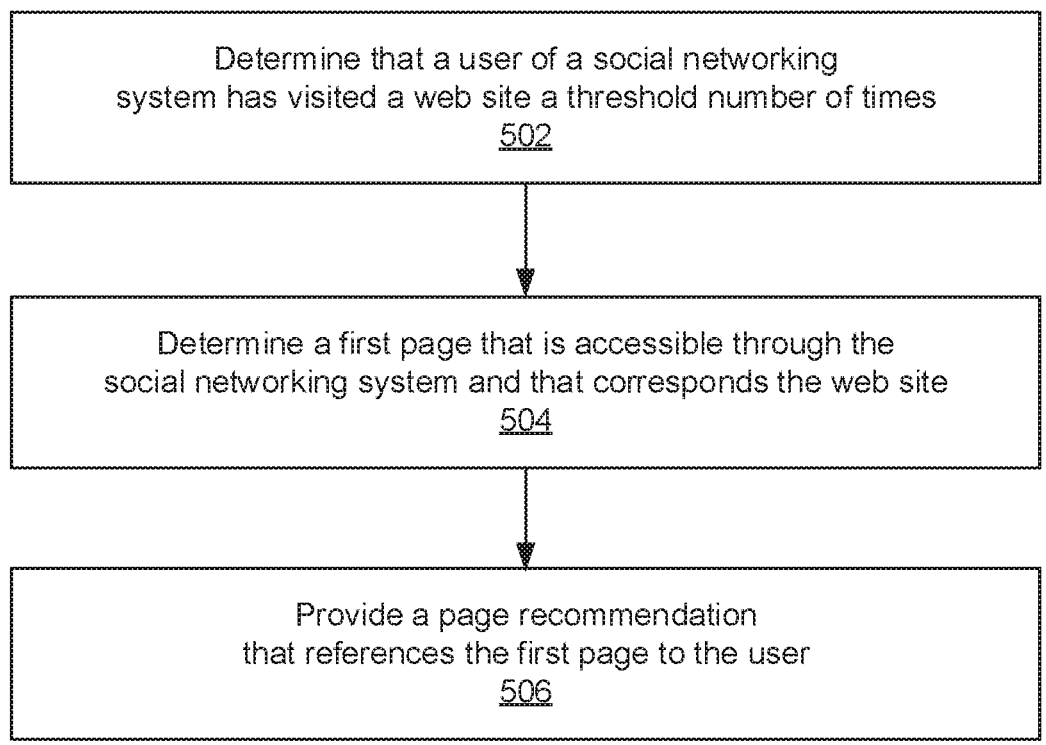
FIG. 5 illustrates another example process for determining page recommendations, according to an embodiment of the present disclosure.

FIG. 5 illustrates another example process for determining page recommendations, according to an embodiment of the present disclosure. It should be appreciated that there can be additional, fewer, or alternative steps performed in similar or alternative orders, or in parallel, within the scope of the various embodiments discussed herein unless otherwise stated. At block 502, a determination is made that a user of a social networking system has visited a web site a threshold number of times. At block 504, a determination is made of a first page that is accessible through the social networking system and that corresponds to the web site visited by the user. At block 506, a page recommended that references the first page is provided to the user.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
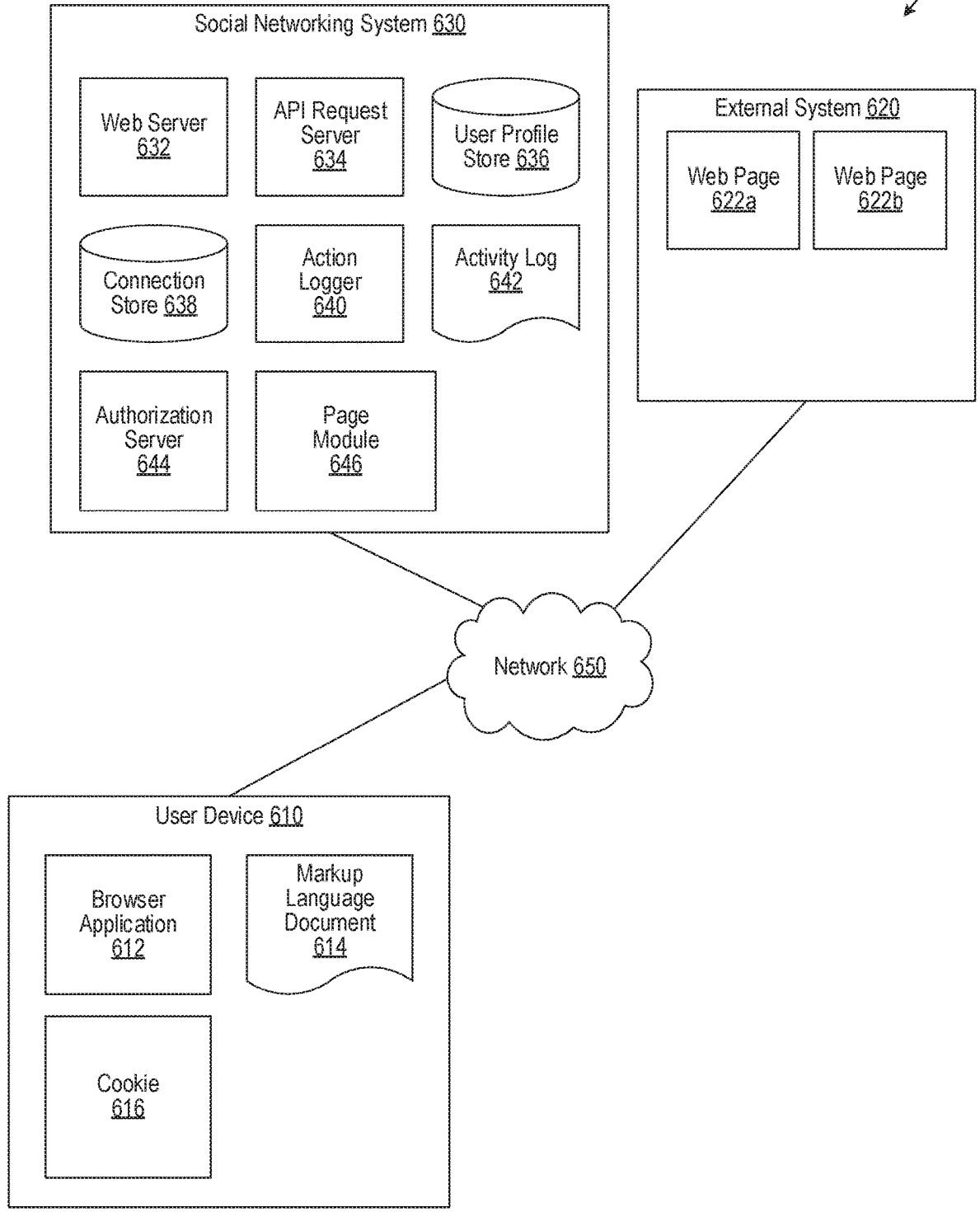
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a page module 646. The page module 646 can, for example, be implemented as the page module 102 of FIG. 1. As discussed previously, it should be appreciated that there can be many variations or other possibilities.

Hardware Implementation

Figure 7:
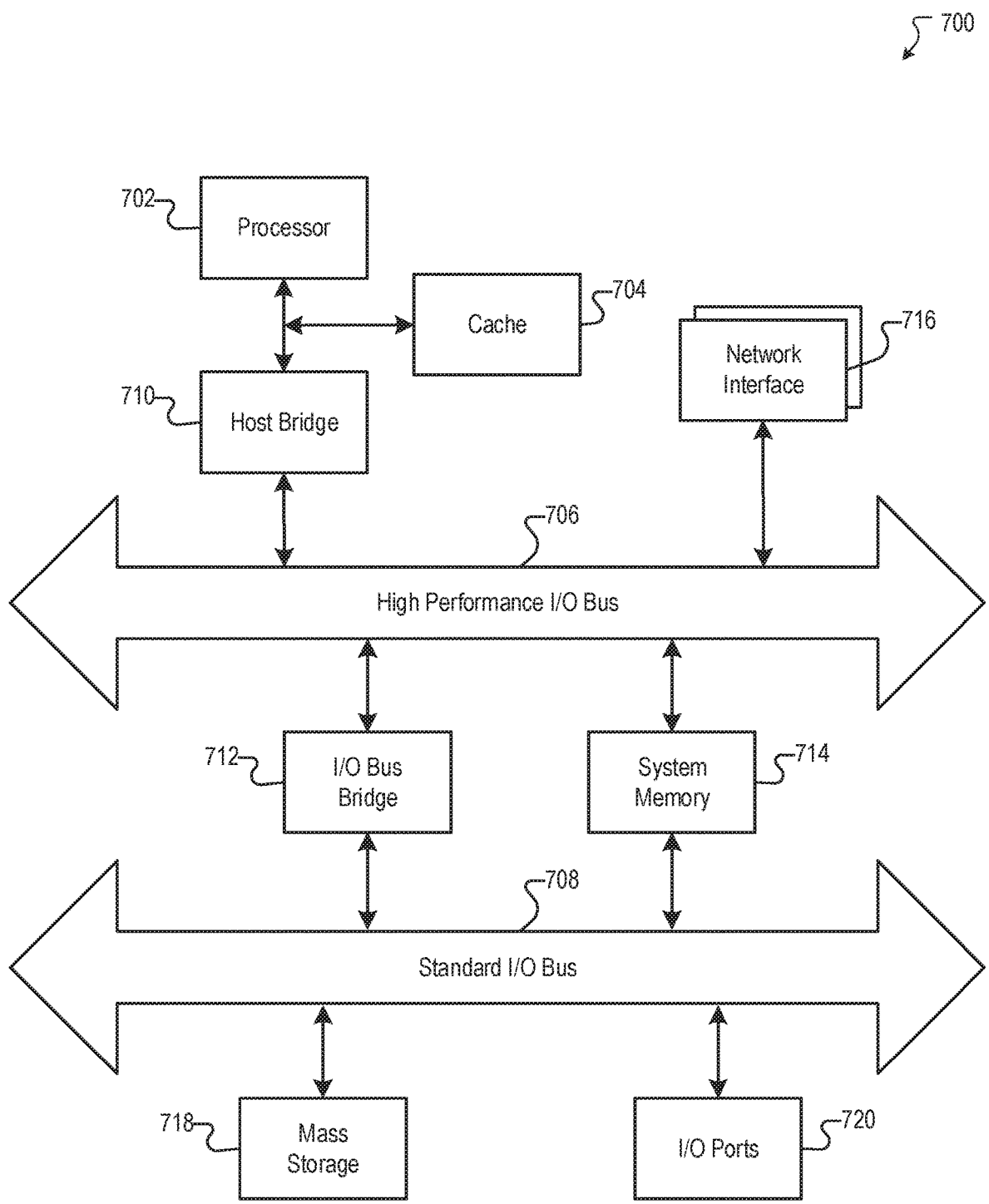
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
generating, by a system, a mapping based at least in part on web sites accessed by users of the system while logged into the system and pages identified by the users, wherein the mapping includes mapped web sites external to the system and mapped pages internal to the system;
determining, by the system, at least one first web site external to the system that is of interest to a first user of the system based at least in part on an interaction of the first user with a plug-in feature provided by the system on the at least one first web site and further based at least in part on a likelihood that the at least one first web site is of interest to the first user, wherein the likelihood is determined by a machine learning model based at least in part on a number of times the first user visits the at least one first web site over a period of time;
determining, by the system, an association between the first user and a cluster of the mapped web sites external to the system that includes the at least one first website that is of interest to the first user based at least in part on a number of visits by the first user to other mapped web sites external to the system within the cluster;
determining, by the system, one or more recommended pages associated with the cluster based at least in part on the mapping, wherein the one or more recommended pages include a first mapped page of the mapped pages internal to the system and wherein the first mapped page was identified by a second user of the system who is associated with the cluster; and
providing, by the system, at least one page recommendation to the first user that references at least one of the one or more recommended pages.

2. The computer-implemented method of claim 1, wherein determining the at least one first web site external to the system that is of interest to the first user of the system further comprises:
determining, by the system, that the first user has visited the at least one first web site a threshold number of times over the period of time.

3. The computer-implemented method of claim 1, wherein determining the at least one first web site external to the system that is of interest to the first user of the system further comprises:
generating, by the system, respective scores for one or more visited web sites visited by the first user, wherein each respective score for each visited web site is based at least in part on a respective decayed count of a number of visits to each of the one or more visited web sites over a period of time; and
determining, by the system, the at least one first web site based at least in part on the respective scores.

4. The computer-implemented method of claim 1, wherein determining the at least one first web site external to the system that is of interest to the first user of the system further comprises:
generating, by the system, the machine learning model for determining the likelihood that the at least one first web site is of interest to the first user.

5. The computer-implemented method of claim 1, wherein the machine learning model is trained using a set of inputs that each include features that at least identify a training user, a training web site visited by the training user, a total number of visits to the training web site by the training user over a period of time, and decayed counts of the training web site visits over the period of time.

6. The computer-implemented method of claim 1, wherein determining the one or more recommended pages further comprises:
identifying, by the system, at least one direct mapping page in the system that is associated with a Uniform Resource Locator (URL) for the at least one first web site.

7. The computer-implemented method of claim 1, wherein determining the one or more recommended pages further comprises:
determining, by the system, the one or more recommended pages from a set of pages that were identified by a first set of users that also visited the at least one web site, wherein the first set of users are recognized by the system as fans of the identified set of pages.

8. The computer-implemented method of claim 7, wherein determining the one or more recommended pages from the set of pages that were identified by a first set of users that also visited the at least one web site further comprises:
grouping, by the system, the users of the system into one or more sets of users based at least in part on the respective web sites visited by each user;
determining, by the system, respective fanned pages that were identified by users in each set of users, wherein each fanned page is identified by a selection of a fan option through the system; and
mapping, by the system, the one or more sets of users to one or more of the fanned pages based at least in part on a collaborative filtering process.

9. The computer-implemented method of claim 1, wherein determining the one or more recommended pages further comprises:
determining, by the system, the one or more recommended pages from a set of pages that were fanned by a set of users that visited a first cluster of web sites, wherein the first cluster of web sites includes the at least one first web site visited by the first user.

10. The computer-implemented method of claim 9, wherein determining the one or more recommended pages from a set of pages that were fanned by a set of users that visited a first cluster of web sites further comprises:
generating, by the system, one or more clusters of web sites, including the cluster, based at least in part on a set of sub-URLs that each correspond to web sites visited by the users of the system;
determining, by the system, respective pages that were fanned by users that visited one or more sub-URLs that are included in each of the one or more clusters; and mapping, by the system, the one or more clusters to one or more of the fanned pages based at least in part on a collaborative filtering process.

11. A system comprising:
at least one processor; and
a memory storing instructions that, when executed by the at least one processor, cause the system to perform:
  generating a mapping based at least in part on web sites accessed by users of the system while logged into the system and pages identified by the users, wherein the mapping includes mapped web sites external to the system and mapped pages internal to the system;
  determining at least one first web site external to the system that is of interest to a first user of the system based at least in part on an interaction of the first user with a plug-in feature provided by the system on the at least one first web site and further based at least in part on a likelihood that the at least one first web site is of interest to the first user, wherein the likelihood is determined by a machine learning model based at least in part on a number of times the first user visits the at least one first web site over a period of time;
  determining an association between the first user and a cluster of the mapped web sites external to the system that includes the at least one first website that is of interest to the first user based at least in part on a number of visits by the first user to other mapped web sites external to the system within the cluster;
  determining one or more recommended pages associated with the cluster based at least in part on the mapping, wherein the one or more recommended pages include a first mapped page of the mapped pages internal to the system and wherein the first mapped page was identified by a second user of the system who is associated with the cluster; and
  providing at least one page recommendation to the user that references at least one of the one or more recommended pages.

12. The system of claim 11, wherein determining the at least one first web site external to the system that is of interest to the first user of the system further causes the system to perform:
  determining that the user has visited the at least one first web site a threshold number of times over the period of time.

13. The system of claim 11, wherein determining the at least one first web site external to the system that is of interest to the first user of the system further causes the system to perform:
  generating respective scores for one or more visited web sites visited by the user, wherein each respective score for each visited web site is based at least in part on a respective decayed count of a number of visits to each of the one or more visited web sites over a period of time; and
  determining the at least one first web site based at least in part on the respective scores.

14. The system of claim 11, wherein determining the at least one first web site external to the system that is of interest to the first user of the system further causes the system to perform:
  generating the machine learning model for determining the likelihood that the at least one first web site is of interest to the first user.

15. The system of claim 11, wherein the machine learning model is trained using a set of inputs that each include features that at least identify a training user, a training web site visited by the training user, a total number of visits to the training web site by the training user over a period of time, and decayed counts of the training web site visits over the period of time.

16. A non-transitory computer-readable storage medium including instructions that, when executed by at least one processor of a system, cause the system to perform a method comprising:
  generating a mapping based at least in part on web sites accessed by users of the system while logged into the system and pages identified by the users, wherein the mapping includes mapped web sites external to the system and mapped pages internal to the system;
  determining at least one first web site external to the system that is of interest to a first user of the system based at least in part on an interaction of the first user with a plug-in feature provided by the system on the at least one first web site and further based at least in part on a likelihood that the at least one first web site is of interest to the first user, wherein the likelihood is determined by a machine learning model based at least in part on a number of times the first user visits the at least one first web site over a period of time;
  determining an association between the first user and a cluster of the mapped web sites external to the system that includes the at least one first website that is of interest to the first user based at least in part on a number of visits by the first user to other mapped web sites external to the system within the cluster;
  determining one or more recommended pages associated with the cluster based at least in part on the mapping, wherein the one or more recommended pages include a first mapped page of the mapped pages internal to the system and wherein the first mapped page was identified by a second user of the system who is associated with the cluster; and
  providing at least one page recommendation to the user that references at least one of the one or more recommended pages.

17. The non-transitory computer-readable storage medium of claim 16, wherein determining the at least one first web site external to the system that is of interest to the first user of the system further causes the system to perform:
  determining that the user has visited the at least one first web site a threshold number of times over the period of time.

18. The non-transitory computer-readable storage medium of claim 16, wherein determining the at least one first web site external to the system that is of interest to the first user of the social networking system further causes the system to perform:
  generating respective scores for one or more visited web sites visited by the user, wherein each respective score for each visited web site is based at least in part on a respective decayed count of a number of visits to each of the one or more visited web sites over a period of time; and
  determining the at least one first web site based at least in part on the respective scores.

19. The non-transitory computer-readable storage medium of claim 16, wherein determining the at least one first web site external to the system that is of interest to the first user of the system further causes the system to perform:
  generating the machine learning model for determining the likelihood that the at least one first web site is of interest to the first user.

20. The non-transitory computer-readable storage medium of claim 16, wherein the machine learning model is trained using a set of inputs that each include features that at least identify a training user, a training web site visited by the training user, a total number of visits to the training web site by the training user over a period of time, and decayed counts of the training web site visits over the period of time.

\* \* \* \* \*